(12) United States Patent
Pairaktaridis

(10) Patent No.: US 8,479,378 B1
(45) Date of Patent: Jul. 9, 2013

(54) METHODS OF MANUFACTURING A STATOR CORE FOR A BRUSHLESS MOTOR

(76) Inventor: John Pairaktaridis, Bayside, NY (US)

( * ) Notice: Subject to any disclaimer, the term of this patent is extended or adjusted under 35 U.S.C. 154(b) by 0 days.

(21) Appl. No.: 13/369,518

(22) Filed: Feb. 9, 2012

(51) Int. Cl.
*H02K 15/14* (2006.01)

(52) U.S. Cl.
USPC ............................. 29/596; 264/272.2; 29/732

(58) Field of Classification Search
USPC .... 29/596–598, 564.1–564.2, 732; 310/67 R, 310/71, 89, 216.009, 216.043; 264/272.2
See application file for complete search history.

(56) References Cited

U.S. PATENT DOCUMENTS

| | | | | |
|---|---|---|---|---|
| 4,532,448 | A * | 7/1985 | Welburn | 310/163 |
| 4,554,491 | A * | 11/1985 | Plunkett | 318/400.41 |
| 5,313,698 | A | 5/1994 | Schaeftlmeier et al. | |
| 5,675,196 | A * | 10/1997 | Huang et al. | 310/67 R |
| 5,861,699 | A * | 1/1999 | Kopac | 310/216.066 |
| 6,600,249 | B2 * | 7/2003 | Nelson et al. | 310/91 |
| 7,221,072 | B2 * | 5/2007 | Ahn | 310/216.001 |
| 7,225,525 | B2 | 6/2007 | Yamamoto et al. | |
| 7,872,391 | B2 * | 1/2011 | Lim | 29/596 |
| 8,251,674 | B1 * | 8/2012 | Pairaktaridis | 417/354 |
| 2005/0140241 | A1 | 6/2005 | Petersen | |
| 2005/0269895 | A1 | 12/2005 | Innami et al. | |
| 2007/0200437 | A1 | 8/2007 | El-Antably et al. | |
| 2008/0256783 | A1 | 10/2008 | Alfermann et al. | |
| 2009/0066183 | A1 | 3/2009 | Aramaki et al. | |
| 2011/0025141 | A1 | 2/2011 | Nord et al. | |

* cited by examiner

*Primary Examiner* — Minh Trinh
(74) *Attorney, Agent, or Firm* — Goldstein Law Offices, P.C.

(57) ABSTRACT

Method of manufacturing a stator core includes stacking a plurality of substantially T-shaped teeth obtained from a jigsaw pattern of said teeth into a plurality of stacks. In each said stack, said teeth are substantially aligned with each other. Said method includes winding said stacks with a plurality of windings and placing said stacks along the perimeter of a polygonal outer surface of a ferromagnetic tube having an inner channel. Each side of said outer surface corresponds to each said stack and contacts the bases of said legs of each said stack. Said method includes inserting said stacks and said tube into an inner space defined by an annular inner surface of a mold and a shaft into said channel. Said stacks are stationed along the circumference of said inner surface. Said method includes vacuum encapsulating said inner space in epoxy resin and removing said mold and shaft.

6 Claims, 5 Drawing Sheets

METHODS OF MANUFACTURING A STATOR CORE FOR A BRUSHLESS MOTOR

TECHNICAL FIELD

Generally, the present disclosure relates to electric motors. More particularly, the present disclosure relates to methods of manufacturing a stator core.

BACKGROUND

In the present disclosure, where a document, act or item of knowledge is referred to or discussed, this reference or discussion is not an admission that the document, act or item of knowledge or any combination thereof was, at the priority date, publicly available, known to the public, part of common general knowledge or otherwise constitutes prior art under the applicable statutory provisions; or is known to be relevant to an attempt to solve any problem with which the present disclosure is concerned.

Electric motors are widely used for converting electrical energy into mechanical energy. A stator is a component in a conventional permanent magnet or electromagnet electric motor. Generally, the stator is a phased electromagnet, which, via magnetization and demagnetization, causes a rotor of the motor to rotate, thus operating the motor. Examples of electric motors include brushed motors and brushless motors.

Quality and quantity of materials used for manufacturing the stator are factors, which often contribute to an operating efficiency of the electric motor. Typically, soft magnetic alloys, such as composites manufactured under Hyperco® 50 Alloy or Vacoflux® brands, possess characteristics desired for stator manufacturing. Some of such characteristics include a high magnetic flux density and a low electromagnetic hysteresis, as exemplified via a thin hysteresis loop.

Disadvantageously however, in many electric motor applications, using soft magnetic alloys as a primary raw material is cost-prohibitive. A conventional stator core manufacturing process entails stamping a plurality of T-shaped stator teeth ringed in a sun-shape from thin laminated steel sheets, stacking the rings to a desired height and mounting the ring stacks onto a shaft for subsequent winding with a coil. As a result of the stamping step, the stamped out portions are subjected to undesired stress and the leftover portions of the sheets remain unused and are thus wasted. Although such waste is tolerable if the sheets are relatively cheap, such tolerance is impractical when the sheets are expensive, sensitive to stress, brittle or delicate, especially when the sheets include soft magnetic alloys. Accordingly, there is a need to address at least one of the foregoing disadvantages.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

The present disclosure effectively addresses at least one of the foregoing disadvantages. However, it is contemplated that the present disclosure may prove useful in addressing other disadvantages in a number of technical areas. Therefore, the claims should not necessarily be construed as limited to addressing any of the particular disadvantages discussed herein.

An object of an example embodiment of the present disclosure is to provide a technology for effectively reducing waste of raw materials used in stator core manufacturing, while effectively addressing at least one drawback resulting from presence of stator slot gaps, increasing winding fill ratio and reducing stator Eddy current.

An example embodiment of present disclosure is a method of manufacturing a stator core. Said method includes stacking a plurality of teeth into a plurality of stacks. Said teeth are obtained from a jigsaw pattern of said teeth. Said teeth are substantially identical to each other in size. Each said tooth is substantially T-shaped as defined by two arms protruding sideways from a leg. In each said stack, said teeth are substantially aligned with each other. Said method further includes winding said stacks with a plurality of windings and placing said stacks along the perimeter of a polygonal outer surface of a ferromagnetic tube having an inner channel extending therethrough. Each side of said outer surface corresponds to each said stack and contacts the bases of said legs of each said stack. Said method yet even further includes inserting said stacks and said tube into an inner space defined by an annular inner surface of a mold and a shaft into said channel. Said stacks are stationed along the circumference of said inner surface. The top surfaces of the arms face said inner surface. Said method also includes vacuum encapsulating said inner space in an epoxy resin and removing said mold and said shaft.

Another example embodiment of present disclosure is a method of manufacturing a stator core. Said method includes stacking a plurality of teeth into a plurality of stacks. Said teeth are obtained from a jigsaw pattern of said teeth. Said teeth are substantially identical to each other in size. Each said tooth is substantially T-shaped as defined by two arms protruding sideways from a leg. In each said stack, said teeth are substantially aligned with each other. Said method further includes winding said stacks with a plurality of windings and placing said stacks along the perimeter of a polygonal inner surface of a ferromagnetic tube. Said inner surface defines an inner space. Each side of said polygonal inner surface corresponds to each said stack and contacts the bases of said legs of each said stack. Said method even further includes inserting a cylindrical shaft into said inner space. The top surfaces of the arms face said shaft. Said method also includes vacuum encapsulating said inner space in an epoxy resin and removing said shaft.

Yet another example embodiment of present disclosure is a method of manufacturing a stator core. Said method includes cutting a sheet into a jigsaw pattern of teeth substantially identical to each other in size. Each said tooth is substantially T-shaped as defined by two arms protruding sideways from a leg. Said sheet includes a soft magnetic alloy. Said method further includes stacking said teeth into a plurality of stacks. In each said stack, said teeth are substantially aligned with each other. Said method even further includes winding said stacks with a plurality of windings. Said method also includes either placing said stacks along the perimeter of a polygonal outer surface of a first ferromagnetic tube having an inner channel extending therethrough, wherein each side of said outer surface corresponds to each said stack and contacts the bases of said legs of each said stack, inserting a shaft into said inner channel and said stacks and said first tube into a mold inner space defined by an annular inner surface of a mold, said stacks are stationed along the circumference of said annular inner surface, the top surfaces of the arms face said annular inner surface, vacuum encapsulating said mold inner space in a first epoxy resin and removing said mold and said shaft, or placing said stacks along the perimeter of a polygonal inner surface of a second ferromagnetic tube, wherein said polygonal inner surface defines a tube inner space, each side of said polygonal inner surface corresponds to each said stack and contacts the bases of said legs of each said stack, inserting a cylindrical shaft into said tube inner space, the top surfaces of the arms face said cylindrical shaft, vacuum encapsulating said tube inner space in a second epoxy resin and removing said cylindrical shaft.

The present disclosure may be embodied in the form illustrated in the accompanying drawings. Attention is called to the fact, however, that the drawings are illustrative only. Variations are contemplated as being part of the disclosure, limited only by the scope of the claims.

BRIEF DESCRIPTION OF THE DRAWINGS

The above and other objects, aspects, advantages and features of the present disclosure will become more apparent to one skilled in the art by describing in further detail example embodiments thereof with reference to the accompanying drawings, in which.

DETAILED DESCRIPTION OF THE PREFERRED EMBODIMENTS

Figure 1:
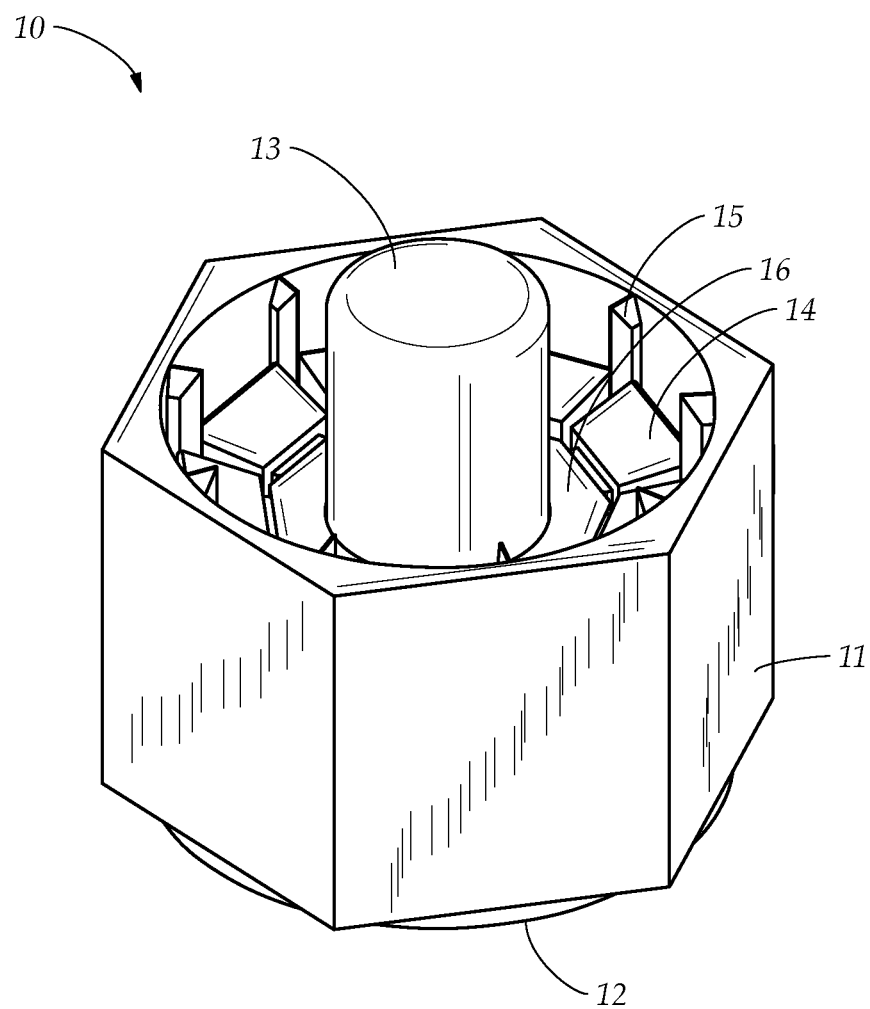
FIG. 1 shows a perspective view of an example embodiment of a plurality of wound stacks placed within a mold according to the present disclosure.

The present disclosure now will be described more fully hereinafter with reference to the accompanying drawings, in which various embodiments are shown. This disclosure may, however, be embodied in many different forms, and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The example term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The example terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All publications, patent applications, patents, figures and other references mentioned herein are expressly incorporated by reference in their entirety.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the present disclosure is further described in detail with reference to the accompanying drawings.

U.S. Pat. No. 8,267,673 is herein incorporated by reference in its entirety.

FIG. 1 shows a perspective view of an example embodiment of a plurality of wound stacks placed within a mold according to the present disclosure.

An assembly 10 includes a mold 11, a base 12, a shaft 13, a plurality of stacks 14, a plurality of separators 15 and a ferromagnetic tube 16. The outer surface of mold 11 is polygonal to facilitate for use with a vise. Shaft 13 is connected to base 12. Base 12 can be connected to mold 11.

Figure 2:
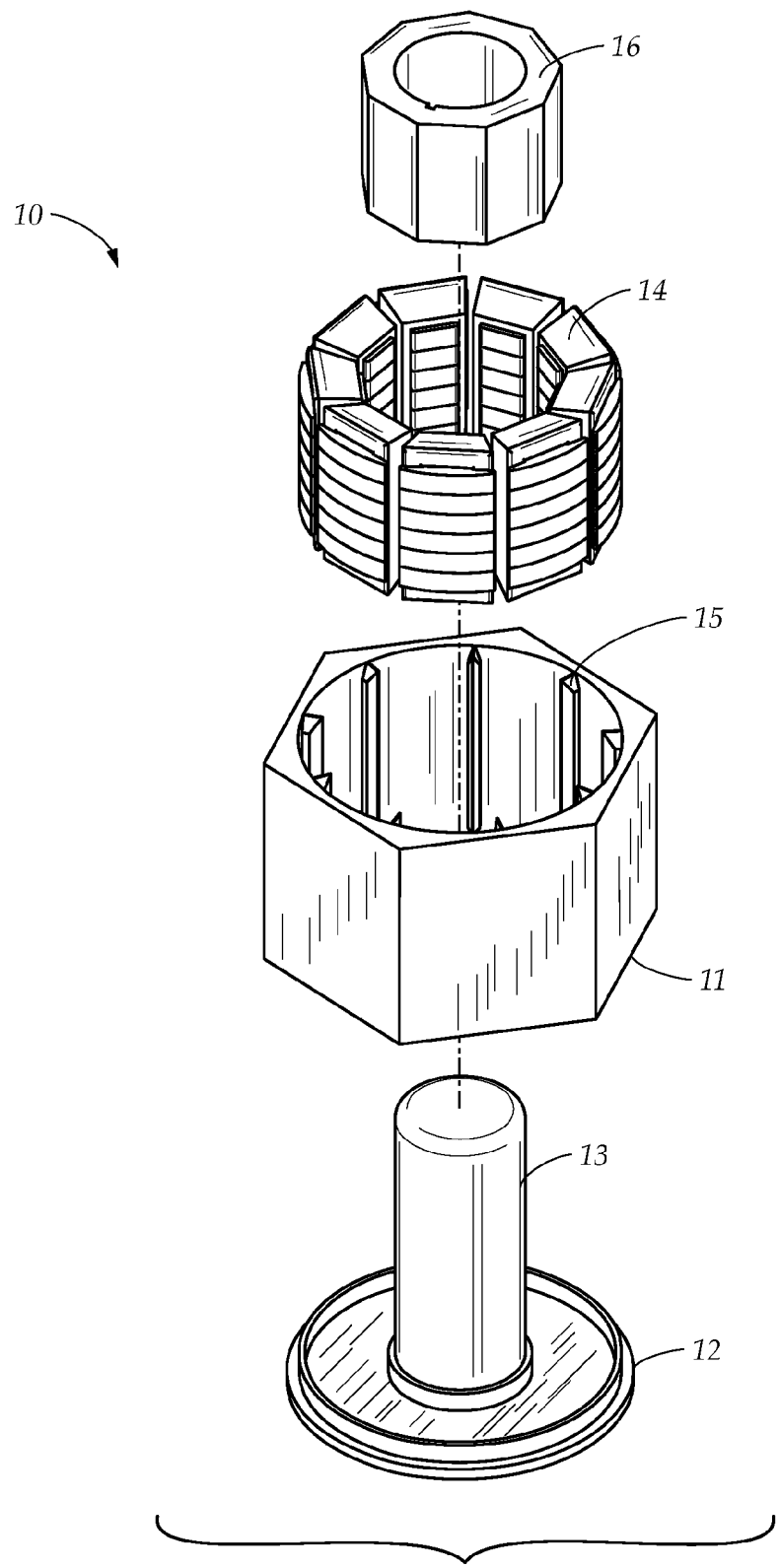
FIG. 2 shows a perspective exploded view of an example embodiment of a plurality of wound stacks placed within a mold according to the present disclosure.

FIG. 2 shows a perspective exploded view of an example embodiment of a plurality of wound stacks placed within a mold according to the present disclosure. Some elements of this figure are described above. Thus, same reference characters identify same or like components described above and any repetitive detailed description thereof will hereinafter be omitted or simplified in order to avoid complication.

Assembly 10 is used in a method of manufacturing a stator core for an electric motor. Said method includes stacking a plurality of teeth into stacks 14. Said teeth are obtained from a jigsaw pattern of said teeth. Said teeth are substantially identical to each other in size. Each said tooth is substantially T-shaped as defined by two arms protruding sideways from a leg. In each stack 14, said teeth are substantially aligned with each other. Stacking teeth into stacks 14 facilitates electrical insulation and allows for thicker laminations for high magnetic material ratio.

Said method also includes winding stacks 14 with a plurality of windings. An example of such winding is a laminated wire. Each said winding corresponds to each stack 14 and loops around said legs along the perimeter of each stack 14. Since teeth 17 are wound from behind, no slot gap is needed. Hence, teeth 17 can be positioned in mold 11 without spacers. Also, such winding allows for significant reduction of stator slot harmonics, thus reducing rotor losses predominantly through vibration and noise. In addition, winding a stator in this manner improves winding uniformity and increases material, such as copper, fill ratio.

Said method further includes placing stacks 14 along the perimeter of a polygonal outer surface of ferromagnetic tube 16 having an inner channel extending therethrough. Said inner channel can be of any shape. Each side of said outer surface corresponds to each stack 14 and contacts the bases of said legs of each stack 14. Tube 16 can include iron.

Said method even further includes inserting shaft 13 into said inner channel and stacks 14 and tube 16 into an inner space defined by an annular inner surface of mold 11. Stacks 14 are stationed along the circumference of said annular inner surface. The top surfaces of the arms face said annular inner surface.

Said method yet even further includes vacuum encapsulating said inner space in an epoxy resin. Stacks 14 are held together via the epoxy. Said method additionally includes removing mold 11 and shaft 13. Mold 11 can be coated with a mold release agent to facilitate release of the hardened epoxy resin. Mold 11 can include aluminum or paraffin. Said vacuum encapsulation mechanically fuses teeth 17 in place, while maintaining the electrically insulated properties of each phase and improving cooling.

Said annular inner surface includes separators 15. Each separator 15 is stationed between two of stacks 14. Separators 15 extend in parallel along said annular inner surface.

Figure 3:
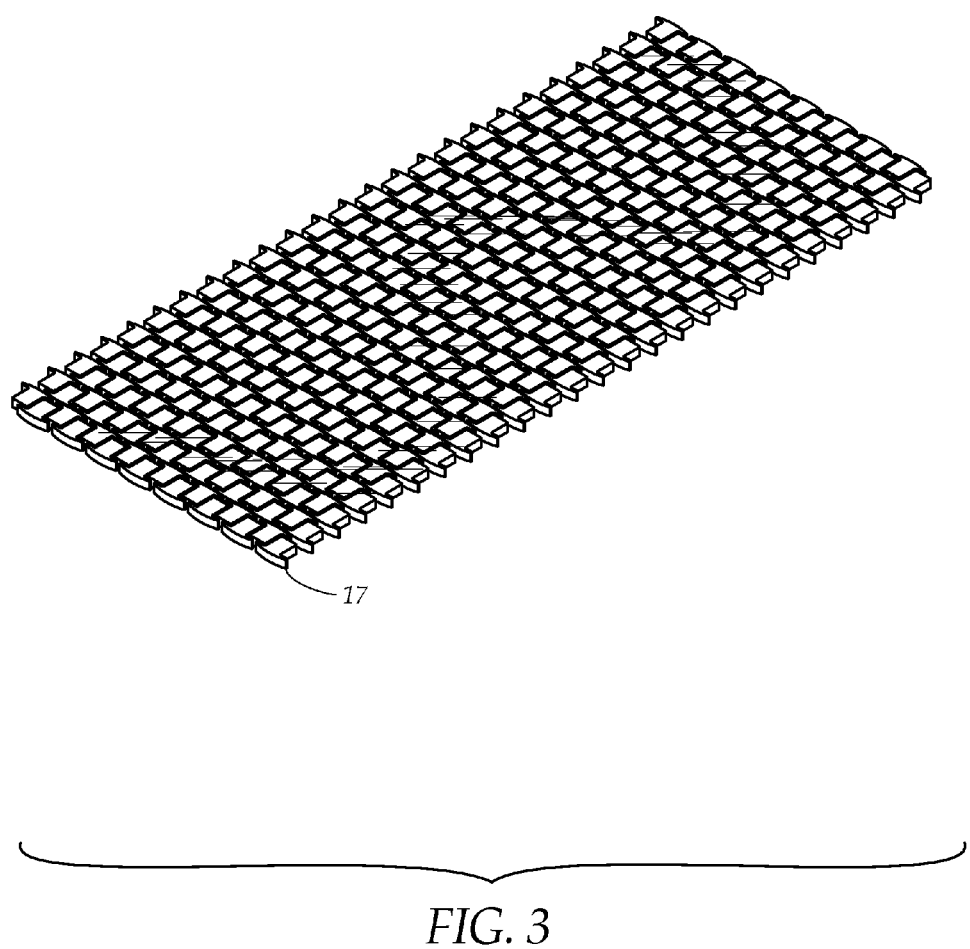
FIG. 3 shows a perspective view of an example embodiment of a plurality of stator teeth cut into a jigsaw pattern according to the present disclosure.

FIG. 3 shows a perspective view of an example embodiment of a plurality of stator teeth cut into a jigsaw pattern according to the present disclosure. Some elements of this figure are described above. Thus, same reference characters identify same or like components described above and any repetitive detailed description thereof will hereinafter be omitted or simplified in order to avoid complication.

A plurality of teeth 17 is obtained from a jigsaw pattern of teeth 17. Within such pattern, teeth 17 are nested. Each tooth 17 is cut separately and within such pattern, teeth 17 are tightly nested allowing for little waste of manufacturing material. Teeth 17 are substantially identical to each other in size. Each tooth 17 is substantially T-shaped as defined by two arms protruding sideways from a leg. Said pattern defines at least a portion of a sheet. At least one of said teeth includes a soft magnetic alloy. Said portion is formed by cutting. Said cutting includes waterjet cutting, which minimally exposes the manufacturing material to thermal and mechanical stress. An example of said soft magnetic alloy is an alloy including cobalt, iron and vanadium of 2%. Such alloys can be manufactured under Hyperco® 50 Alloy or Vacoflux® brands.

Figure 4:
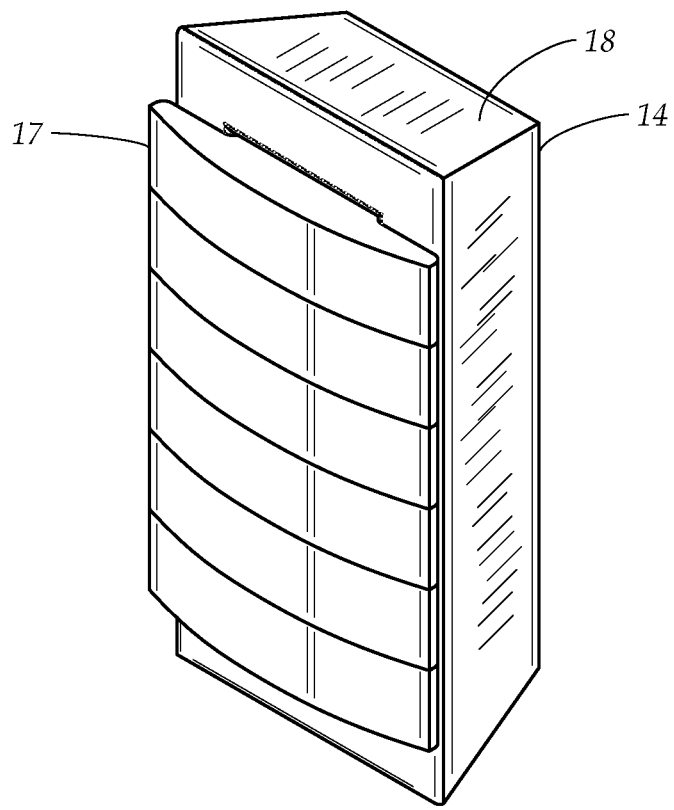
FIG. 4 shows a perspective view of an example embodiment of a plurality of stator teeth wound with a winding according to the present disclosure.

FIG. 4 shows a perspective view of an example embodiment of a plurality of stator teeth wound with a winding according to the present disclosure. Some elements of this figure are described above. Thus, same reference characters identify same or like components described above and any repetitive detailed description thereof will hereinafter be omitted or simplified in order to avoid complication.

Stacks 14 are wound with a plurality of windings 18, such as a laminated wire. Each winding 18 corresponds to each stack 14 and loops around said legs along the perimeter of each stack 14.

Figure 5:
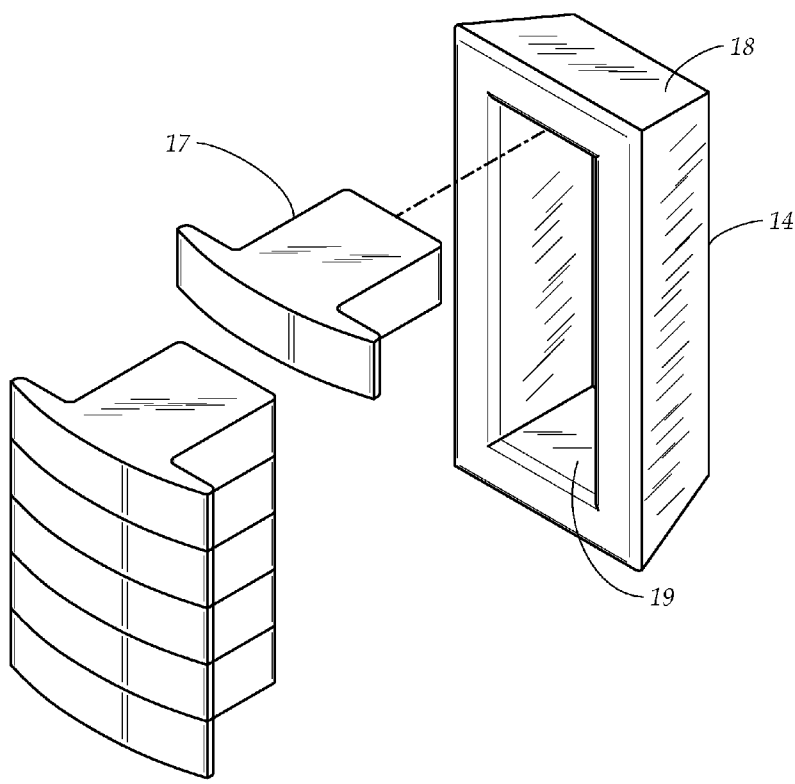
FIG. 5 shows a perspective view of an example embodiment of a stator tooth prior to insertion into a winding according to the present disclosure.

FIG. 5 shows a perspective view of an example embodiment of a stator tooth prior to insertion into a winding according to the present disclosure. Some elements of this figure are described above. Thus, same reference characters identify same or like components described above and any repetitive detailed description thereof will hereinafter be omitted or simplified in order to avoid complication.

Teeth 17 are stacked into stacks 14. Each tooth 17 is substantially T-shaped as defined by two arms protruding sideways from a leg. In each stack 14, teeth 17 are substantially aligned with each other. Stacks 14 are wound with windings 18. Each winding 18 corresponds to each stack 14 and loops around said legs along the perimeter of each stack 14. At least one of windings 18 is a coil or a belt.

As a result of the foregoing, stator core can be used with an outer rotor. Also, scrap material from which teeth are cut is effectively reduced. This allows for use of more powerful and expensive soft magnetic alloys, while maintaining affordability. Furthermore, each tooth 17 is electrically insulated from each other thereby reducing Eddy currents or core loss, thus improving efficiency/power density of an electric motor employing such stator core. Moreover, the winding process is simplified, since each stack 14 is wound from the back allowing for less material and less resistance losses.

Using the above description and accompanying drawings, it is apparent to one skilled in the art that said method can be modified to manufacture another type of rotor, such as an inner rotor. Accordingly, another example embodiment of present disclosure is a method of manufacturing a stator core. Said method includes stacking a plurality of teeth 17 into a plurality of stacks 14. Teeth 17 are obtained from a jigsaw pattern of teeth 17. Teeth 17 are substantially identical to each other in size. Each tooth 17 is substantially T-shaped as defined by two arms protruding sideways from a leg. In each said stack, teeth 17 are substantially aligned with each other. Said method further includes winding stacks 14 with a plurality of windings 18 and placing stacks 14 along the perimeter of a polygonal inner surface of a ferromagnetic tube. Said inner surface defines an inner space. Each side of said polygonal inner surface corresponds to each stack 14 and contacts the bases of said legs of each stack 14. Said method even further includes inserting a cylindrical shaft 13 into said inner space. The top surfaces of the arms face shaft 13. Said method also includes vacuum encapsulating said inner space in an epoxy resin and removing shaft 13.

In said method, said pattern can define at least a portion of a sheet. At least one of teeth 17 can include a soft magnetic alloy. At least one of windings 18 can be a coil or a belt. Each winding 18 can correspond to each stack 14 and loop around said legs along the perimeter of each stack 14. At least one of windings 18 can be laminated.

In said method, said portion can be formed by cutting. Shaft 13 can include a plurality of separators 15. Each separator 15 can be stationed between two of stacks 14.

In said method, shaft 13 can be connected to a base 12. Separators 15 can extend in parallel along the length of shaft 13. Said cutting can include waterjet cutting.

In said method, the outer surface of said tube can be polygonal. Said mold can include paraffin or aluminum.

In said method, stacks 14 can have a substantially identical height.

Yet another example embodiment of present disclosure is a method of manufacturing a stator core. Said method includes cutting a sheet into a jigsaw pattern of teeth 17 substantially identical to each other in size. Each tooth 17 is substantially T-shaped as defined by two arms protruding sideways from a leg. Said sheet includes a soft magnetic alloy. Said method further includes stacking teeth 17 into a plurality of stacks 14. In each stack 14, teeth 17 are substantially aligned with each other. Said method even further includes winding stacks 14 with a plurality of windings 18. Said method also includes either placing stacks 14 along the perimeter of a polygonal outer surface of a first ferromagnetic tube 16 having an inner channel extending therethrough, wherein each side of said outer surface corresponds to each stack 14 and contacts the bases of said legs of each stack 14, inserting a shaft 13 into said inner channel and stacks 14 and said tube 16 into a mold inner space defined by an annular inner surface of a mold 11, stacks 14 are stationed along the circumference of said annular inner surface, the top surfaces of the arms face said annular inner surface, vacuum encapsulating said mold inner space in a first epoxy resin and removing mold 11 and shaft 13, or placing stacks 14 along the perimeter of a polygonal inner surface of a second ferromagnetic tube, wherein said polygonal inner surface defines a tube inner space, each side of said polygonal inner surface corresponds to each stack 14 and contacts the bases of said legs of each stack 14, inserting a cylindrical shaft 13 into said tube inner space, the top surfaces of the arms face said cylindrical shaft 13, vacuum encapsulating said tube inner space in a second epoxy resin and removing said cylindrical shaft 13.

In said method, said cutting can include waterjet cutting. At least one of windings 18 can be a coil or a belt.

In said method, shaft 13 can be connected to a base 12. The outer surface of mold 11 can be polygonal.

In said method, base 12 can be connected to mold 11. Stacks 14 can have a substantially identical height.

In conclusion, herein are presented methods of manufacturing a stator core. Embodiments of the present disclosure are illustrated by example in the drawing figures and throughout the written description. It should be understood that numerous variations are possible, while adhering to the present disclosure without departing from the broader spirit and scope of the disclosure as set forth in the claims that follow. Such variations are contemplated as being a part of the present disclosure.

What is claimed is:

1. A method of manufacturing a stator core, said method comprising:
    stacking a plurality of teeth into a plurality of stacks, wherein said teeth are obtained from a jigsaw pattern of said teeth, said teeth are substantially identical to each other in size, each said tooth is substantially T-shaped as defined by two arms protruding sideways from a leg, in each said stack said teeth are substantially aligned with each other;
    winding said stacks with a plurality of windings;
    placing said stacks along the perimeter of a polygonal outer surface of a ferromagnetic tube having an inner channel extending therethrough, wherein each side of said outer surface corresponds to each said stack and contacts the bases of said legs of each said stack;
    inserting said stacks and said tube into an inner space defined by an annular inner surface of a mold and a shaft into said channel, wherein said stacks are stationed along the circumference of said inner surface, the top surfaces of the arms face said inner surface;
    vacuum encapsulating said inner space in an epoxy resin; and
    removing said mold and said shaft.

2. The method of claim 1, wherein said pattern defines at least a portion of a sheet, at least one of said teeth includes a soft magnetic alloy, at least one of said windings is a coil or a belt and each said winding corresponds to each said stack.

3. The method of claim 2, wherein said portion is formed by cuffing, said annular inner surface includes a plurality of separators, at least one of said windings is laminated and each said separator is stationed between two of said stacks.

4. The method of claim 3, wherein said shaft is connected to a base, said separators extend in parallel along said annular inner surface, said cuffing includes waterjet cuffing.

5. The method of claim 4, wherein the outer surface of said mold is polygonal, said mold includes paraffin or aluminum.

6. The method of claim 5, wherein said base is connected to said mold, said stacks have a substantially identical height.

* * * * *